UNITED STATES PATENT OFFICE.

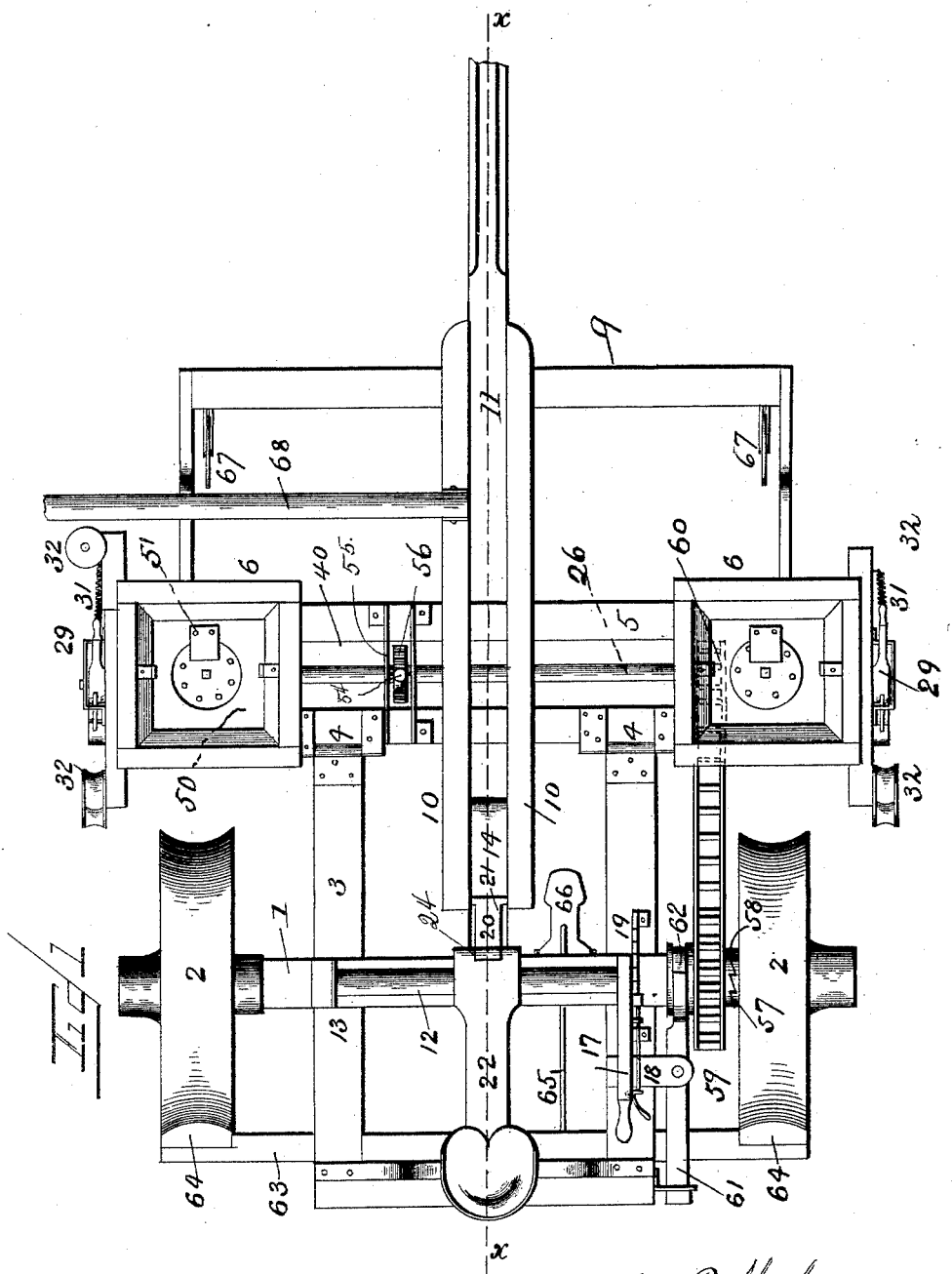

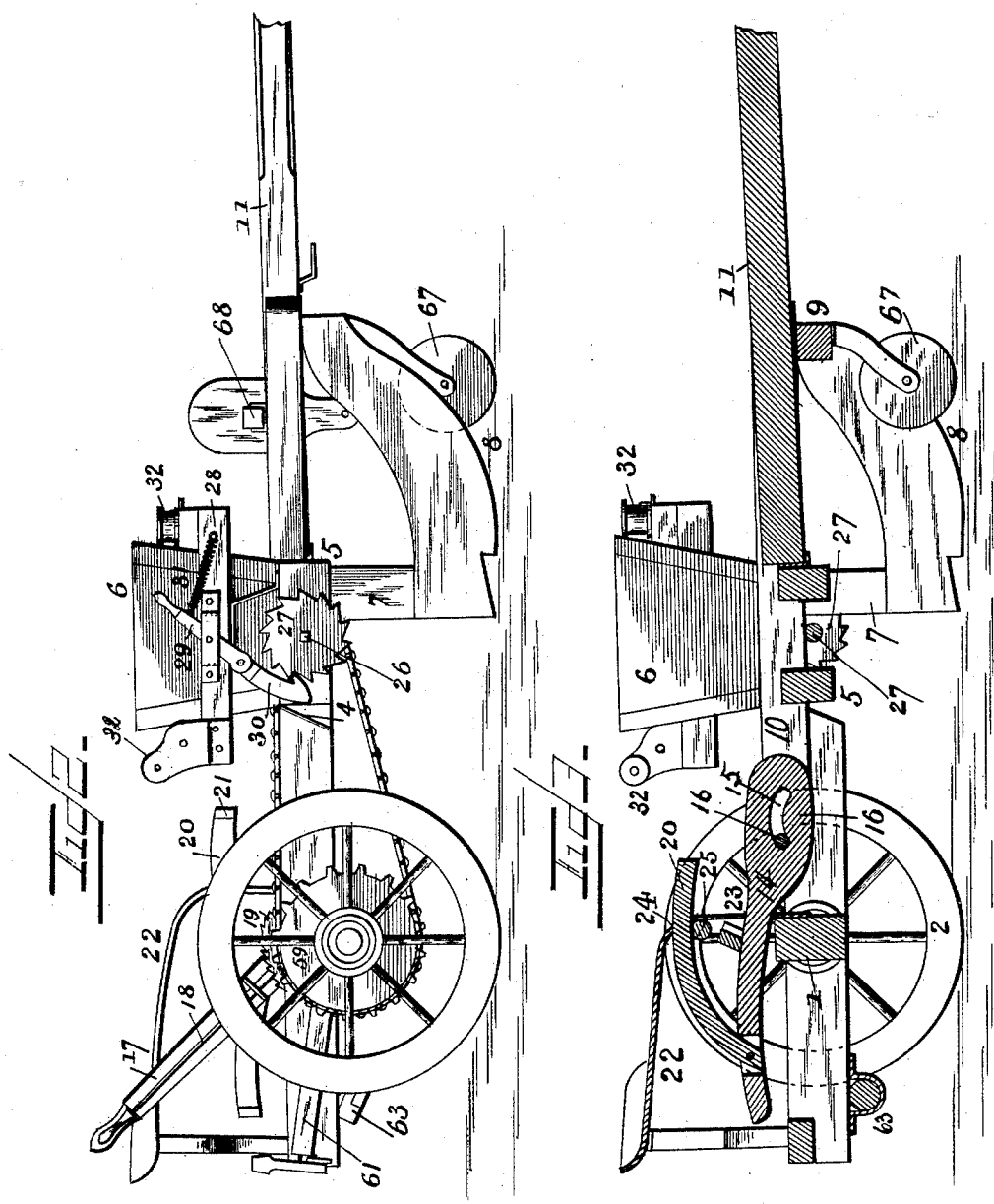

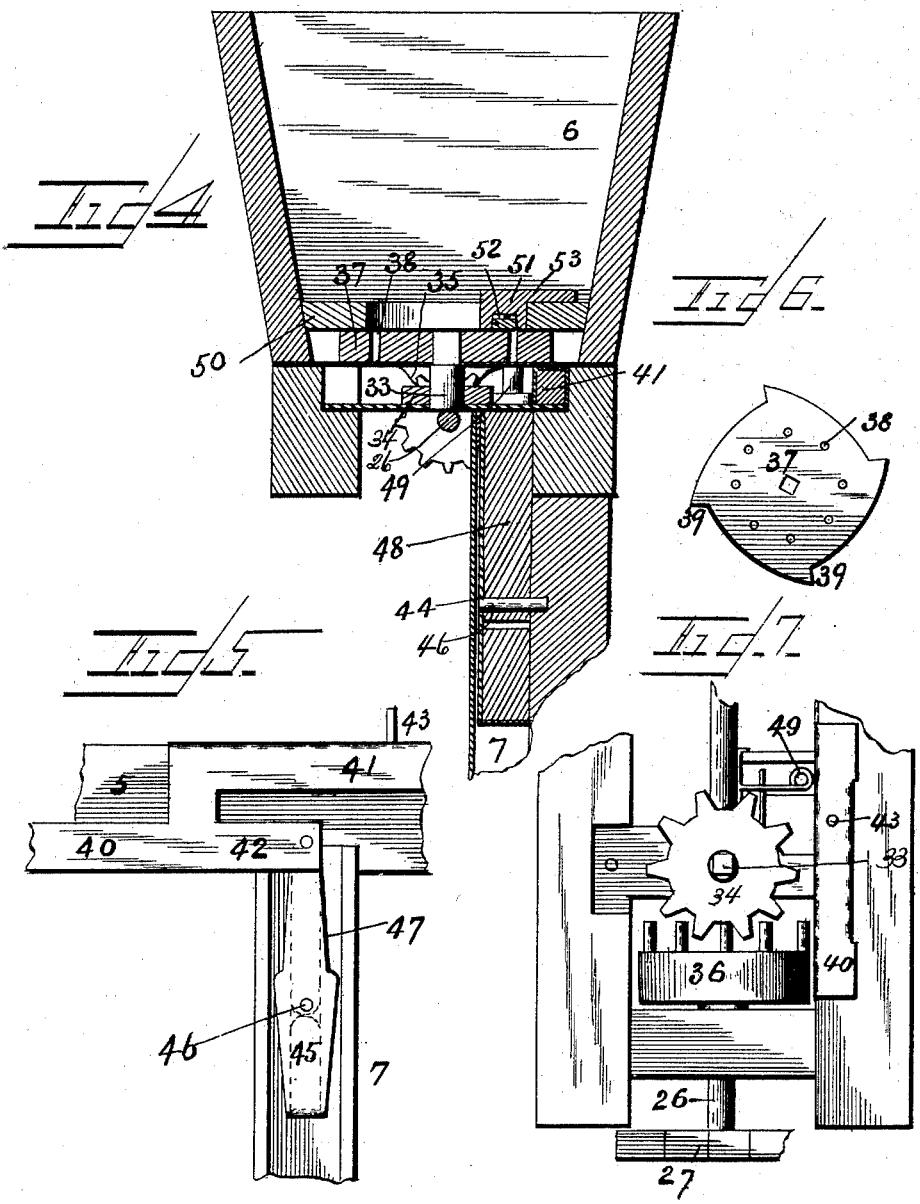

JOHN P. ALINDER, OF OSCEOLA, NEBRASKA.

CORN-PLANTER.

SPECIFICATION forming part of Letters Patent No. 468,231, dated February 2, 1892.

Application filed June 20, 1891. Serial No. 396,996. (No model.)

*To all whom it may concern:*

Be it known that I, JOHN P. ALINDER, a citizen of Sweden, residing at Osceola, in the county of Polk and State of Nebraska, have invented certain new and useful Improvements in Corn-Planters; and I do hereby declare the following to be a full, clear, and exact description of the invention, such as will enable others skilled in the art to which it appertains to make and use the same.

My invention consists in a new and improved corn-planter, which can be used either as a check-row planter, a drill-planter, or the dropping mechanism can be operated by the hand, and my invention will be hereinafter fully described and claimed.

Referring to the accompanying drawings, Figure 1 is a top plan view of my new and improved combined check-row and drill planter. Fig. 2 is a side elevation of the same. Fig. 3 is a sectional view taken on line *x x* of Fig. 1. Fig. 4 illustrates in detail, on an enlarged scale, the check-row dropping mechanism at one end of the machine. Figs. 5, 6, and 7 are detail views of several parts of the mechanism that will be hereinafter described.

Referring to the several parts by their designating numerals, 1 indicates the axle, upon the ends of which are mounted the supporting drive-wheels 2 2, the peripheries of which are concave to adapt them to cover in the furrow after the corn has been dropped therein. The axle is rigidly secured to the rectangular rear frame 3. The front ends of the side pieces of this frame are hinged at their upper ends or corners to the rear cross-beam of the forward runner-frame by the hinges 4.

5 indicates the runner-frame of the machine, upon the ends of which the seed-boxes 6 6 are mounted, the runners or furrow-openers 8 curving up from the tubes 7, through which the seed drop to a front cross-bar 9.

10 10 indicate two parallel bars, which are secured upon the center of the forward frame 5, their front ends being secured upon the front cross-bar 9, while their rear ends extend back to the wheel-frame. The rear end of the tongue 11 is secured between the forward half of the parallel bars 10, as shown.

Upon the axle 1 is mounted in end bearings 13 a shaft 12, and to the middle of this shaft is secured the longitudinally-arranged lever 14. The forward end of this lever extends between the rear ends of the parallel bars 10 and is formed with the longitudinal curvilinear slot 15, a transverse bolt 16 passing through the rear ends of the bars 10 and the slot 15. To the right-hand end of the shaft 12 is secured a hand-lever 17, having a spring-catch 18, adapted to engage with the teeth of a curved rack 19, and in the slot in the rear end of the lever 14 is pivoted the rear end of a curved foot-lever 20, the free end of which is provided with the projection 21 for the driver's feet.

22 indicates a curved seat-support, the lower end of which is secured to the axle, this metal support being formed with the lower opening 23, through which the lever 14 passes, and with an opening 24, through which the curved foot-lever 20 moves, and an anti-friction roller 25 is mounted in bearings at the lower edge of the opening 24, so as to receive the friction of the curved foot-lever as the latter moves through said opening. It will now be seen that by freeing the catch of the hand-lever 17 from the rack 19 and pressing downward and forward on the front end of the foot-lever 20 the shaft 12 will be turned and will press the rear ends of the bars 10 downward through the connecting-lever 14, thus lowering the runner-frame, while by drawing back on the hand-lever 17 the runner-frame can be raised, as will be readily understood.

In the runner-frame 5 is mounted in bearings the feed-shaft 26, which is round in cross-section. Upon the ends of this shaft are secured the ratchet-wheels 27, which are formed with the inclined teeth, as shown.

Upon the outer side of each seed-box 6 is secured a bar 28, at the center of which is pivoted a small lever 29. To the lower end of this lever is pivoted a gravitating pawl 30, adapted to engage with the inclined teeth of the ratchet-wheels 27. The upper end of each lever 29 is divided to enable the ordinary knotted wire check-row line to pass through it and for the buttons to operate it.

31 31 indicate coiled springs, the rear ends of which are connected to the levers 29, while their forward ends are secured to the bars 28. Upon the front and rear ends of the bars 28 are mounted the guide-rollers 32. The knotted check-row line passes between the front guide-rollers on one of the bars 28, through the divided upper end of the lever 29 on the seed-box, and through the rear guide-rollers, and it will be seen that as each knot on the check-row line reaches the divided upper end of the lever 29 it will pull the same back, thus drawing its pivoted pawl 30 forward, so as to turn the feed-shaft 26 through the ratchet-wheels 27 the desired distance. As soon as the knot on the check-row line passes from the end of the lever the coiled spring 31 pulls the lever back into its normal position. It will be seen that the knotted check-row line can be used on either side of the planter, and in planting it is easily changed from one side of the planter to the other at each end of the row when the planter is turned around.

Through the center of the bottom of each seed-box passes a short vertical shaft 33, upon the lower round end of which is mounted, but not rigidly secured, a pinion 34, a curved spring-plate 35 being mounted above the pinion, (the vertical shaft passing through it,) so as to press the pinion down into engagement with the teeth of a crown-wheel 36, secured to the shaft 26 near the end of the same. Upon the squared upper end of each vertical shaft 33 is mounted a seed-disk 37, which is formed with a series of apertures 38, arranged in a circle, while the periphery of the seed-disk is formed with the projections 39.

40 indicates a reciprocating dropper-bar, which is mounted in bearings in the frame 5, as shown, and is formed at both ends with the upper and lower parallel longitudinal arms 41 42. The upper arms 41 extend within the seed-boxes, and their upper edges are bent over horizontally and are provided with the pins 43, with which the projections 39 of the seed-disks 37 are adapted to engage.

Within each seed chute or tube 7, at the middle of the same, is formed or secured a longitudinal division-block 44, leaving a space on each of its sides.

45 45 indicate the flirt-valves, one of which is mounted in each of the seed-chutes 7. These flirt-valves are of the peculiar form shown, and each one is secured in its seed-chute by a central pivot-pin 46. The lower end of the flirt-valve is bent in at right angles, while its sides 47 above its pivotal point are bent in parallel to each other to hold between them a wooden block 48, through the lower end of which the pivot-pin 46 passes. The ends of the lower arms 42 enter the upper ends of the seed-chutes 7 and are pivoted to the upper ends of the flirt-valves 45. It will now be seen that as the planter travels forward one of the levers 29 is operated by the knotted check-row line, thus turning the feed-shaft 26, and that the teeth of the crown-wheel 36, engaging with the pinions 34, will turn the vertical shafts 33 and with them the seed-disks 37. The seed-disks are turned to bring one of their apertures 38 above the discharge-openings 49 in the bottom of the seed-boxes, thus dropping the desired amount of seed for the hills in the two furrows.

Above each seed-disk 37 is arranged a ring 50, to which is secured an inwardly-extending block or casing 51. This block extends directly above the discharge-opening 49, and within a recess in its under side is pivoted at one end a pressure-pad or cut-off 52, which is normally pressed outward by a small spring 53, arranged in the recess beneath it. These pressure-pads or cut-offs will brush the surplus grain from the top of the seed-disk apertures, which are just about to register with the discharge-openings 49, and will prevent more seed than is contained in one disk-opening from dropping down through the discharge-opening, as will be readily understood. The seed-disks are revolved inward, and each disk is formed with twice as many apertures 38 as it has edge projections 39, and the two seed-disks are so arranged with reference to each other that their projections will alternately come in contact with the pins 43 of the dropper-bar 40, thus moving the said bar alternately from side to side. When the dropper-bar is slid to one side, it turns the two flirt-valves 45 on their central pivots, drawing their upper ends to one side of the seed-chute 7, while their lower inwardly-bent ends will close the lower ends of the spaces, into which the seed from the seed-disks is then dropped. When the next quantity of seed is about to be dropped, the flirt-valve at one side of the machine is moved in the opposite direction by the projections of the seed-disk above the flirt-valve at the other side of the machine, thus releasing the seed they were holding, which falls from the space at one side of the stationary block 44 and stopping the seed, which then falls from the seed-disks.

When desired, the seed can be dropped by the use of a hand-lever 54, instead of using the check-row line. This hand-lever is pivoted in the bearing 55 on the runner-frame 5, and its lower end is adapted to engage with the inclined teeth of a pinion 56, which is keyed on the feed-shaft 26, so that whenever the lever 54 is turned back by hand the shaft 26 will be partially rotated to turn the seed-disks for the requisite distance.

Upon the inner end of the hub of the right-hand wheel 2 is secured a clutch-collar 57, which is adapted to be thrown into engagement with a similar clutch-collar 58, formed on one end of the hub of a sprocket-wheel 59. This sprocket-wheel is connected by a drive-chain with a sprocket-pinion 60, secured on the feed-shaft 26, and can be thrown into and out of engagement with the clutch-collar 57 by means of a lever 61, the forward end of which is curved to fit in an annular groove 62, formed in the inner end of the sprocket-wheel hub. When the sprocket-wheel is thrown into engagement with the drive-wheel 2, the feed-shaft 26 will be rapidly revolved and the dropping mechanism as rapidly actuated to cause the machine to work as a drill-planter when so desired.

At the rear end of the wheel-frame is mounted in bearings a scraper-bar 63, the ends of which are provided with the scraping-blades 64, having their edges curved to fit the concaved peripheries of the covering-wheels 2. The scraper-bar is pivotally connected by a rod 65 with the foot-lever 66, by depressing which the concaved scraper-blades are brought into contact with the concaved peripheries of the covering-wheels and will then scrape them clear of dirt, &c. By this simple device the covering-wheels can always be kept clear and in perfect working condition.

At the forward end of each runner or furrow-opening 8 I mount in a suitable bearing a revolving cutter-blade 67.

The planter is formed or provided with the usual reversible marker 68, which can be turned over to either side to mark for the next row.

Having thus described my invention, what I claim, and desire to secure by Letters Patent, is—

1. In a planter, substantially as described, the combination, with a rotatable shaft 26, a suitable means for rotating said shaft, the crown-wheels 36, fixed thereon, the seed-boxes having discharge-openings, the vertical shafts 33, having the pinions 34 on their lower ends, the seed-disks 37, mounted on said vertical shafts and having the peripheral projections 39 and the series of apertures 38, the chutes 7, and the centrally-pivoted flirt-valves mounted in said chutes, of the reciprocating dropper-bar 40, the upper arms 41 at the ends of said dropper-bar, the pins 43 on the said upper arms adapted to be engaged by the peripheral projections of the seed-disks, and the lower arms 42 at the ends of the dropper-bar arranged parallel with the upper arms 41 and pivotally connected at their ends to the upper ends of the flirt-valves, all substantially as and for the purpose set forth.

2. In a planter, substantially as described, the combination, with the seed-boxes, the dropping mechanism arranged therein, the transverse shaft connected with and adapted to actuate the dropping mechanism, and ratchet-wheels fixed on the ends of the said shaft, of the levers fulcrumed at the sides of the seed-boxes and having their upper portions slotted for the passage of the check-line, the gravitating pawls pivotally connected to the lower ends of the levers and engaging the teeth of the ratchet-wheels, and coiled springs connected at one end to the seed-boxes in advance of the levers and connected at their opposite ends to said levers above the fulcrum-point thereof, substantially as specified.

3. In a planter, substantially as described, the combination, with the runner-frame, the longitudinal parallel bars 10, mounted thereon, the wheel-frame flexibly connected to the runner-frame, the seat-support 22, connected to the axle of the wheel-frame and having the lower opening 23 and the upper opening 24, and the friction-roller 25, mounted in bearings at the lower edge of the opening 24, of the lever 14, extending rearwardly through the opening 23 of the seat-support and having a longitudinal curvilinear slot adjacent to its forward end, a transverse bolt taking through the bars 10 of the runner-frame and through said curvilinear slot, the foot-lever 20, pivotally connected to the lever 14 and extending forwardly through the opening 24 of the seat-support, the shaft 12, mounted in bearings and fixedly connected to the lever 14 at an intermediate point in the length thereof, and a suitable means for rocking said shaft 12, all substantially as and for the purpose set forth.

In testimony whereof I affix my signature in presence of two witnesses.

JOHN P. ALINDER.

Witnesses:
M. E. BITTNER,
C. G. JOHNSON.